United States Patent [19]

Wells

[11] 3,716,634
[45] Feb. 13, 1973

[54] INSECT VIRUS COMPOSITIONS AND PROCESS
[75] Inventor: Frank E. Wells, Kansas City, Mo.
[73] Assignee: McLaughlin Gormley King Company, Minneapolis, Minn.
[22] Filed: Oct. 19, 1970
[21] Appl. No.: 82,083

[52] U.S. Cl. .................................424/93, 195/1.5
[51] Int. Cl. ................................................C12r 7/00
[58] Field of Search ..................424/93; 195/1.5

[56] References Cited

UNITED STATES PATENTS 3,541,203  11/1970  Fogle et al..............................424/93

OTHER PUBLICATIONS

Burnet et al., "The Viruses," Vol. I, published by Academic Press, New York, 1959, pages 509-511
Chemical Abstracts (1), Vol. 58, entry 12785c, 1963
Chemical Abstracts (2), Vol. 69, entry 16485x, 1968
Chemical Abstracts (3), Vol. 70, entry 111595n, 1969

Primary Examiner—Richard L. Huff
Attorney—Pendleton, Neuman, Williams & Anderson

[57] ABSTRACT

Insect polyhedrosis and granulosis virus particles are liberated from their inclusion bodies and then complexed and precipitated from an aqueous dispersion with a basic protein having an isoelectric point above about pH 8.0 to provide a virus concentrate. The resulting precipitate may be dispersed in an oil to provide a stabilized viral insecticide.

7 Claims, No Drawings

3,716,634

INSECT VIRUS COMPOSITIONS AND PROCESS

BACKGROUND AND OBJECTS OF THE INVENTION

This invention relates to insect virus compositions and processes for preparing the same.

It is generally recognized that many insect pests are becoming immune to chemical control agents which latter have fallen into disrepute in recent years because of the potential for some of them to leave residues that are hazardous to non-insect animal and plant life. As a result, there is an increasing interest in the so-called biological pesticides which are represented by infectious bacteria and viruses, which do not leave such hazardous residues, which are specific for infecting particular insects and which because of the nature of their action are capable of creating artificial epizootics within a population of the target insects or those of closely related species.

Insect viruses have been given some attention for this purpose by workers in this field. However, at least until recently, the only feasible method known for the production of insect viruses which can be used as control agents in insecticides involves the propagation of the virus directly within the bodies of the insects for which the virus is specific. In the prior processes of preparing a virus product of the polyhedrosis or granulosis type, a colony of insects is maintained in a manufacturing facility and the insects are inoculated with the virus. The insects become diseased and as a result the bodies of each insect are thoroughly infested with virus particles which are encased within so-called inclusion bodies. The insects are then macerated and the macerate is dried or mixed with a carrier thereby providing a viral insecticide product which is more or less specific for the particular species of insect in which the virus is grown in the manufacturing facility. A difficulty with this method of preparing the virus product is that the end product, in addition to the virus, contains insect parts and debris and undesirable bacteria and other microorganisms which may incidently be present within the bodies of the insects which become diseased with the virus. The procedures above indicated have been suggested for use particularly in connection with those viruses known to cause polyhedrosis or granulosis virus diseases in chewing insects, particularly those species belonging to the order Lepidoptera but also including species in the orders Coleoptera, Hymenoptera and Diptera.

When an insect is infected with a polyhedrosis type virus, whether it be of the cytoplasmic or nuclear type, the virus particles within the cells develop and become encased in so-called polyhedral inclusion bodies, each body containing a number of individual virus particles. These bodies form in vast numbers within the cells of the diseased insect resulting in the death of the insect. It is these bodies which, when liberated from the insect upon maceration, constitute the infective agent for the viral insecticide produced by the previous methods above referred to. These polyhedral inclusion bodies each encase a large number of individual virus particles and protect and stabilize the individual virus particles until such time as the target insect consumes the inclusion body and it finds its way into the middle gut, where the virus is freed from the inclusion body to start the cycle of virus particle multiplication and development of inclusion bodies in the new independent host insect all over again.

In the granulosis virus insect diseases, the course of the development of the disease and the encasement of the virus particle within an inclusion body are similar except that each virus particle is encased within a separate granule.

In view of the fact that the previously suggested commercial preparations of viruses of the polyhedrosis type all consist essentially of polyhedral inclusion bodies, each of which is indivisible upon application but contains a large number of potentially infective virus particles, it will be apparent that the infectivity titer of such a product is relatively low when compared to the total number of virus particles since at least one polyhedral body is required to infect one target insect. The total number of individual virus particles in that body would be potentially capable of infecting a large number of target insects if the virus particles were liberated from the polyhedral inclusion body before application to the insects. Thus, by freeing the particles from the polyhedral inclusion bodies, the infectivity titer is greatly increased by a factor which is theoretically proportional to the average number of virus particles within each body.

Also, it has been found that virus particles when liberated from the polyhedral or granular inclusion bodies are very infective upon contact with the insect for which the virus is specific but are relatively unstable in the presence of ultra-violet light or oxygen. For this reason the virus particles liberated from their inclusion bodies cannot satisfactorily be used as the active ingredient in commercially useful viral insecticides.

Accordingly, a further object of this invention is the provision of a process of concentrating and stabilizing virus particles of the polyhedrosis and granulosis types.

A further object of this invention is the provision of a process for producing a viral insecticide which is essentially free of insect fragments and other objectionable materials normally found in the bodies of insects used to propagate the virus.

A further object of this invention is the provision of a process for preparing a virus product which acts rapidly to infect the host insect.

A still further object of this invention is the provision of a process for increasing the infectivity titer of polyhedrosis insect viruses.

Further and additional objects will appear from the following description and appended claims.

THE VIRUSES

The viruses used to practice the process and to form the product of this invention are those capable of infecting insects (i.e., species within the zoological class Insecta) and are known to the art either as insect granulosis viruses or as insect polyhedrosis viruses, which latter may be of the nuclear or the cytoplasmic type. As is recognized in the art, a virus capable of infecting a given species of insect is more or less specific for that insect. Accordingly, in the naming of a particular insect virus, it is the usual practice to identify it not only by reference to the type of virus but also to the species of the infected insect from which it was isolated or to the species of insect which will be infected by the virus. However, recent investigations have indicated that certain of the insect viruses are not only specific for the species of insect from which isolated but may also infect related species.

As previously indicated, the polyhedrosis viruses are those which form so-called polyhedral inclusion bodies within the infected insect and these inclusion bodies are found either within the insect cell nucleus or within the insect cell cytoplasm. The viruses forming the inclusion bodies located in the nucleus are known as nuclear polyhedrosis viruses and those forming inclusion bodies in the cell cytoplasm are known as cytoplasmic polyhedrosis viruses. Both types are comprehended within the scope of this invention. In either case, the polyhedral inclusion bodies consist essentially of capsules of proteinaceous material. Each of these capsules contains a plurality of individual virus particles which are the infective agents of the virus. The granulosis viruses are in many respects similar to the polyhedrosis viruses. In the granulosis viruses, however, each virus particle formed in the diseased insect is encased in a single granule, inclusion or capsule body, which is also proteinaceous in nature. The virus particles are liberated from the inclusion bodies, whether granular or polyhedral, when they pass to the middle gut of an insect after ingestion thereby infecting the insect. Also, the free virus particles can be liberated from the interior of the inclusion bodies by suitable chemical treatment such as addition of an alkaline reacting material, as is known to the art. However, the virus particles so liberated are relatively unstable even to the extent that they will not survive passage through the foregut of the insect and accordingly heretofore have not been useful per se as infective agents in a viral insecticide.

The viruses suitable for use in accordance with this invention are any of those originally isolated from and are infectious for various species of insects within the class Insecta and particularly those within the order Lepidoptera. Those particularly suitable for use are those which are infective for insects whose larvae feed directly on plant leaves or other plant parts by chewing, such as those classified within the order Lepidoptera and certain members of the orders Coleoptera, Hymenoptera and Diptera. Particular species of insects that are presently known to be susceptible to polyhedral and granulosis viral infection and which are the insect hosts for viruses included within the scope of this invention are set forth in the following list, together with a common name of the species:

| | |
|---|---|
| *Lymontria monacha* | (nun moth) |
| *Porthetria dispar* | (gypsy moth) |
| *Trichoplusia ni* | (cabbage looper) |
| *Choristoneura fumiferana* | (spruce budworm) |
| *Heliothis zea* | (corn earworm) |
| *Spodoptera frugiperda* | (fall armyworm) |
| *Prodenia eridania* | (southern armyworm) |
| *Colias eurytheme* | (alfalfa caterpillar) |
| *Heliothis virescens* | (tobacco budworm) |
| *Autographa californica* | (alfalfa looper) |
| *Pseudaletia unipuncta* | (armyworm) |
| *Spodoptera exigua* | (beet armyworm) |
| *Pieris rapae* | (imported cabbage worm) |
| *Pectinophora gossypiella* | (pink bollworm) |
| *Peridroma margaritosa* | (variegated cutworm) |
| *Prodenia ornithogalli* | (yellow-striped armyworm) |
| *Prodenia praefica* | (western yellow-stiped armyworm) |
| *Diprion hercyniae* | European spruce sawfly) |
| *Neodiprion sertifer* | European pine sawfly) |
| *Neodiprion pratti banksianae* | (jackpine sawfly) |
| *Tipula paludosa* | (crane fly) |

GENERAL DESCRIPTION OF THE INVENTION

It has now been discovered that insect virus particles which have been liberated from polyhedral or granular inclusion bodies and suspended in an aqueous solution may be precipitated from that solution by the addition of a basic protein having an isoelectric point greater than about pH 8.0. The resulting co-precipitated material is believed to be a complex of the virus particles, the solubilized polyhedral inclusion body or granular inclusion body protein and the basic protein. In this form the liberated virus particles included within the complex are relatively stable and the complex is useful as an active ingredient for a viral insecticide composition which is specific for the species of insect from which the original virus was obtained or a closely related species. It has been further found that when the complex is dispersed in an inert oil, such as a vegetable or mineral oil, the stability of the virus particles is still further enhanced so that the composition will withstand storage for a relatively long period of time without losing its insect infectivity.

In accordance with one embodiment of this invention, an aqueous suspension of inclusion bodies of a granulosis or polyhedrosis virus is prepared. This is accomplished by infecting a colony of a species of insect with a virus of the appropriate type which is known to produce a polyhedrosis or granulosis virus disease in that species. After infection, the insects are incubated until the virus disease becomes apparent. At this stage inclusion bodies, each containing one or more individual virus particles, develop within the body of each insect in large quantities to the extent that the insect body may become swollen or distended. The diseased insects are then macerated in water, saline solution or buffered water or saline solution and the macerate is set aside for a period of several days at room temperature to permit bacterial or autolytic enzymatic decomposition of the insect residue. Neither autolytic nor bacterial digestion adversely affects the inclusion bodies contained within the macerate or the infectivity of the virus particles contained within the inclusion bodies. After tissue digestion has been accomplished, the digested macerate is preferably passed through a coarse filter in order to separate the large insect fragments but to leave in aqueous suspension the inclusion bodies.

The suspension of inclusion bodies, with or without further purification, is then contacted with an aqueous solution of an alkali for a period of time to dissolve the inclusion body protein and to liberate the individual virus particles into the solution. After this liberation, which may be confirmed by microscopic examination, the resulting suspension is centrifuged or filtered to remove from the suspension other particulate material such as insect tissue fragments, bacterial contaminants, and the like, but without removing the free virus particles from the suspension. Thereafter the basic protein complexing agent is added to the suspended virus, preferably under alkaline pH conditions, until maximum flocculation has occurred. Maximum flocculation can usually be achieved by adding the protein at a ratio of about 10 to 15 parts of protein for each part by weight of polyhedral inclusion bodies initially used to form the suspension treated. The floc or precipitate is then collected by centrifugation and the supernatant liquid is discarded. The precipitate which comprises the complex of added protein, virus particles and inclusion body protein is then suspended in a suitable chemically inert vegetable, animal or mineral oil to provide a product which is useful as a viral insecticide specific for that species of insect from which the inclusion bodies of the virus were originally obtained.

SPECIFIC EXAMPLES

For a more complete understanding of this invention, reference will now be made to several specific examples which illustrate methods for carrying out the process and to produce the product.

EXAMPLE 1

Eggs of the fall armyworm, i.e., *Spodoptera frugiperda*, are obtained commercially or from reared adults. These eggs are allowed to hatch to form larvae and the larvae are transferred to a small cup containing a small amount of a suitable synthetic larvae diet medium in accordance with conventional practice. These larvae are allowed to grow in the cups for 6 to 8 days at room temperature. They are then infected by spraying the diet medium in the cup with an aqueous suspension of polyhedral inclusion bodies obtained by the maceration of a body of one or more diseased fall armyworm larvae. The thus-sprayed colony is set aside for about 7 days. During this period any larvae that may die are removed from the colony to prevent cannibalism and are separately frozen. At the end of the 7th day, all of the larvae, including those remaining in the cup and those previously removed and frozen, are collected and mixed with about 3 parts by weight of water for each part by weight of larvae. The resulting mixture is macerated in any suitable manner by grinding or otherwise and the resulting mass is set aside for a period of a week or 10 days at room temperature during which period the remaining material decomposes to a large degree by bacterial or enzymatic action. The resulting suspension is filtered through a rough filter, such as cheese cloth, to remove large undecomposed larval fragments. The resulting filtered mass contains a high percentage of suspended polyhedral inclusion bodies which encase the virus particles. This suspension is centrifuged to separate the polyhedral bodies in the form of a wet paste. The bodies are resuspended in water and recentrifuged, with these steps being repeated several times. The washed paste containing the polyhedral inclusion bodies is then dried and the resulting product represents a suitable source for the fall armyworm virus polyhedral inclusion bodies which are subsequently treated in accordance with this invention.

In this example 7.5 mg. of dried polyhedral inclusion bodies prepared as indicated immediately above are suspended in 6 ml. of 0.05M aqueous sodium carbonate solution and digested for 1-½ hours at room temperature. During this period of time substantially all of the protein of the polyhedral inclusion bodies is solubilized, as can be observed by microscopic examination, and the virus particles are liberated to the solution. The liquid is then centrifuged for ten minutes at 4,000 gravity in order to separate any undigested materials but to leave the liberated virus particles in suspension. The supernatant liquid having a pH of about 10.0 and being about 0.05M with respect to sodium carbonate has added thereto about 100 mg. of a crystalline lysozyme preparation. This is an egg white lysozyme preparation known as Lysozyme [Muramidase] (egg white) commercially available from Nutritional Biochemicals Corporation of Cleveland, Ohio. The lysozyme treated liquid is then allowed to stand in the refrigerator for 30 minutes or longer to permit full development and settling of the floc or precipitate which appears upon lysozyme addition. Thereafter the suspension is centrifuged for 15 minutes at 1,500 gravity in order to pack the floc into a wet pellet or paste at the bottom of the centrifuge tube. The supernatant liquid is discarded and the paste is diluted with 4 ml. of an aqueous phosphate buffer at pH 7 in order to neutralize the carbonate. The suspension is again centrifuged at 1,500 gravity to separate the solids in the form of a pellet and the solids are suspended in 3 ml. of cottonseed oil with violent agitation. This cottonseed oil suspension is a product prepared in accordance with this invention and the 3 ml. quantity indicated is the virus particle equivalent of 7.5 mg. of the dried polyhedral inclusion bodies initially used in its preparation.

This lysozyme-virus particle-cottonseed oil suspension was tested for infectivity against larvae of the fall armyworm and in this test two controls or reference materials were used. The first control material consisted of 7.5 mg. of dried polyhedral inclusion bodies per se prepared as previously indicated and suspended in 3 ml. of cottonseed oil. The second control material also consisted of 7.5 mg. of dried polyhedral inclusion bodies but was suspended in 3 ml. of water instead of cottonseed oil. In this test 0.01 ml. of each suspension tested was placed on the surface of a synthetic larvae diet medium in individual cups each having an area of five square inches. The test material was spread over the surface of the medium with a small brush.

A total of 60 diet cups were prepared, 20 cups being treated with the lysozyme-virus product and 20 cups each being treated with the first and second control materials, as above indicated. One 3-day old larva of the fall armyworm was then placed in each cup and the cups were set aside to incubate at room temperature (70° to 75° F.) for 12 days. At the end of three days all the larvae were dead in all of the 20 cups treated with the lysozyme-virus-cottonseed oil product. However, in each of the control samples the full incubation period of 12 days resulted only in a 90 per cent kill. In all instances where death occurred, the insect cadavers upon microscopic examination showed evidence of nuclear polyhedrosis virus disease.

EXAMPLE 2

Example 1 was repeated except that the virus and the larvae of the corn earworm (i.e., *Heliothis zea*) were used in the preparation of the product and the carrying out of the tests. The results obtained were essentially the same.

EXAMPLE 3

Approximately 5 mg. of dried polyhedral inclusion bodies collected from the larvae of the fall armyworm and prepared as described in Example 1 were suspended in 2 ml. of 0.1 molar aqueous sodium carbonate solution and allowed to digest for one-half hour at room temperature. At the end of the one-half hour period, 2 ml. of distilled water was added to bring the carbonate molarity of the solution to 0.05M. Pieces of insect tissues, bacteria and other solid impurities were separated from the virus particles in suspension by centrifuging the carbonate solution at 4,000 gravity for fifteen minutes. The supernatant liquid contained primarily polyhedral body protein in carbonate solution and free virus particles.

Approximately 75 mg. of dried crystalline egg white lysozyme was slowly added to the carbonate solution until heavy flocculation occurred. At the end of two hours the flocculant had settled to the bottom of the tube and the upper liquid was clear. The flocculant was further packed to the bottom of the tube by centrifugation for 15 minutes at 1,500 gravity and the supernatant liquid was decanted to a clean tube and the pellet at the bottom of the centrifuged tube was allowed to drain by inverting the tube for 5 minutes. After the carbonate solution had drained from the pellet, the precipitate was resuspended in 4 ml. of distilled water and the pellet was dispersed by vigorous shaking.

Ten cups of semi-synthetic larva diet medium, each having a surface area of 5 square inches, were each covered with 0.5 ml. of the carbonate solution which was decanted from the flocculated precipitate of lysozyme and virus. The surfaces of an additional ten cups containing the same medium were covered with 0.5 ml. of the suspension resulting from the water dispersion of the pellet above referred to. One 4-day old larva of the fall arymworm was transferred to each cup and the cups containing the larvae were held at approximately 75° F. and observed for symptoms of nuclear polyhedrosis virus infection or until pupation occurred.

It was observed that all of the larvae in the cups treated with the lysozyme-virus product developed symptoms of nuclear polyhedrosis virus disease and died. Microscopic examination of the cadavers revealed large numbers of the typical inclusion bodies which develop when larvae are infected with nuclear polyhedrosis virus. On the other hand, all of the larvae placed on the cups treated with the supernatant liquid remaining after the precipitation of the lysozyme-virus complex developed into normal pupae and eventually emerged as normal-appearing moths. The test reported in this example indicates that substantially all of the virus particles were separated from suspension by treatment with lysozyme.

EXAMPLE 4

As a part of the procedure for collecting polyhedral inclusion bodies from insect larvae diseased with a polyhedrosis virus, as set forth in Example 1, the cadavers of living bodies of diseased larvae are macerated with water and set aside until the tissues are partially digested by bacterial or tissue enzymatic action. During this period, insect tissues or fragments freed from the bulk of the polyhedral inclusion bodies may be collected by filtration, settling or centrifugation. However, this solid residue usually contains some undigested tissue fragments which may still contain polyhedral inclusion bodies. In one embodiment this invention provides a means for recovering at least a portion of the viral activity from these residues.

Thus, in accordance with this modification of the invention, tissue fragment residues (mostly integument in nature) from a macerated and digested mass of fall armyworm tissues (approximately 100 larvae) were harvested and treated with 20 milliliters of 0.1M aqueous sodium carbonate solution for thirty minutes. The solution was then diluted to 0.05M sodium carbonate by the addition of an equal volume of water and held for an additional 30-minute period at room temperature. At the end of this second period, the material was filtered through several layers of cheesecloth to remove the larger pieces of tissue. The filtrate was then centrifuged for 15 minutes at 4,000 gravity to remove the smaller particulate material and the supernatant liquid resulting from this centrifuging step was decanted into a clean container.

Lysozyme was added to the alkaline supernatant liquid which contained dissolved proteins and some free virus particles until maximum flocculation had occurred. Approximately 1 gram of lysozyme was used. The container was then set aside in the refrigerator for 2 hours. At the end of this time a heavy flocculant material had formed and it was separated from the liquid phase by centrifuging for 10 minutes at 4,000 gravity. The pellet containing the complex of lysozyme, virus particles and polyhedral inclusion body protein, and perhaps some insect tissue protein, was dispersed in 2 ml. of water and approximately one-half gram of dried non-fat milk solids was added. This mixture was then spread as a thin film on glass and allowed to dry at room temperature. When the material was dry, it was scraped from the glass with a stainless steel blade, collected as a dry powder and stored in a glass vial.

Viral activity of this product was determined by suspending the dried powder in distilled water and spreading aliquots of the suspension over the surface of a semi-synthetic larva medium in 4 ounce cups having a surface area of 5 square inches. Normal undiseased larvae of the fall arymworm were transferred to each cup and the larvae were observed periodically for symptoms of nuclear polyhedrosis disease. The observations in this test showed that 20 per cent of the larvae in the cups treated with 1.25 mg. of the virus particle complex developed nuclear polyhedrosis disease; 50 per cent of the larvae treated at a level of 5 mg. per cup developed typical disease symptoms; and 80 per cent of the larvae treated at a level of 10 mg. per cup died from nuclear polyhedrosis. These results show that virus particles obtained by solubilizing polyhedral inclusion bodies directly in insect fragments and then precipitated with lysozyme are effective as viral insecticides. The results of this particular experiment cannot be compared quantitatively to the effects shown by the tests reported in Examples 1, 2 and 3 because in this example the bulk of the polyhedral inclusion bodies had already been removed from the insect fragments before treatment with the alkali and subsequent precipitation with the lysozyme.

EXAMPLE 5

A viral insect-control agent was prepared from a lysozyme-precipitated virus for use on sweet corn. The virus used in this product was a nuclear polyhedrosis type isolated from larvae of the corn earworm (*Heliothis zea*, Boddie). It was made by precipitating the viruses and solubilized polyhedral proteins of 100 mg. of polyhedra with 1 gram of lysozyme (25 ml. of solution) essentially as described in Examples 1 and 2. The precipitate was collected and suspended in 100 ml. of cottonseed oil. For use, 30 ml. of the oil concentrate is diluted in a volume of water sufficient to give thorough coverage on 1 acre, the amount being dependent upon the type of sprayer used for application. An emulsifier was added to give a homogeneous mixture (0.2% Triton X100, Rohm and Haas). The stabilized-virus, insect-control product is the applied with ordinary field-spraying equipment.

EXAMPLE 6

A viral control agent was prepared from lysozyme precipitated nuclear polyhedrosis viruses of the tobacco budworm (*Heliothis virescens*) for use on cotton. The virus liberated from 200 mg. of a crude, dried polyhedra composite essentially as described in Example 1 was precipitated by the addition of lysozyme (polyhedra-lysozyme ratio, 1:15). The precipitate that resulted (complex of lysozyme, virus and polyhedral protein) was collected one hour after the initial lysozyme addition. The precipitate was resuspended in 100 ml. of cottonseed oil (refined). Laboratory assay using larvae of the tobacco budworm indicated good viral activity in the product. In use, 20 ml. of the oil suspension of lysozyme-precipitated, stabilized, virus is diluted in a sufficient quantity of water to give adequate coverage of 1 acre. Uniform distribution of the precipitated virus was assured by the use of an emulsifier. The stabilized viral agent is applied with the usual sprayer devices used to treat crops with chemical insecticides.

EXAMPLE 7

Large quantities of granulosis inclusion bodies of the fall armyworm (*Spodoptera frugiperda*) were harvested essentially by the process described in Example 1 by collecting the fat-body tissues of larvae infected with the virus by the oral route. The capsules were dried, and the dried material was used as a source of virus for preparing viral insecticides. In this example 10 milligrams of dried capsular material are suspended in 1 milliliter of 0.025 molar sodium carbonate and allowed to digest for a period of 1 hour. One hundred milligrams of lysozyme is then added and the suspension is allowed to stand for 1 hour during which time a flocculant precipitate develops. This is suspended in cottonseed oil with a small amount of a non-ionic emulsifier (Triton X100) to provide an insecticide concentrate.

EXAMPLE 8

Products made from lysozyme-precipitated nuclear polyhedrosis viruses for use in the field are prepared by the same processes used to make the agents for control of corn earworm and tobacco budworm. An example of these field-use products is one in which 50 mg. of polyhedra of a nuclear polyhedrosis virus are dissolved in weak alkali solution and the free virus particles are separated from the particulate debris by centrifugation. The liberated virus particles in the weak alkali (pH range preferably 8 to 10) are treated with dry lysozyme, or a concentrated solution of lysozyme, using 10-15 mg. of lysozyme for each mg. of polyhedra digested. The weight-volume ratio of the inclusion-body:alkali solution is near 5 mg. polyhedra per ml. solution. The precipitate is allowed to form either at room temperature or in the cold (4°-10° C.) and is collected after 1 hour, or longer, reaction time. The complex of lysozyme-virus-polyhedra protein is then dispersed in refined cottonseed oil (10 ml.) and held in this vehicle until used. For use, the oil suspension is diluted in water with the aid of an emulsifying agent and applied to crops with ordinary spraying equipment. The product is applied at rates from 1-10 ml. of concentrate per acre.

EXAMPLE 9

A supply of fall armyworm granulosis virus was obtained from the USDA Experimental Station at Tifton, Georgia. This material was supplied as freeze-dried granulosis capsules. Ten milligrams of the supplied capsules were digested for one hour in 10 milliliters of 0.03 molar sodium carbonate to free the viral rods. The suspension of liberated virus particles was then cleared of extraneous materials by centrifugation. Lysozyme was added at the ration of 10-15 mg. lysozyme/each mg. capsular material initially present. A heavy precipitate began to form within a few minutes of the addition of lysozyme and the reactions were allowed to go to completion for 2 hours in the refrigerator. The lysozyme-granulosis virus complex was collected and resuspended in 100 milliliters of cottonseed oil containing 0.2 per cent Triton X100. The resulting product may be diluted with water and applied to crops for control of the fall arymworm.

EXAMPLE 10

One ml. of an aqueous solution containing 10 per cent lysozyme was added to a suspension of virus particles liberated from 30 mg. of tobacco budworm polyhedrosis inclusion bodies (in 5 ml. of 0.05 M $Na_2CO_3$). This addition resulted in the formation of a heavy complex. The insoluble material resulting from this first addition (ratio — 100 mg. lysozyme to 30 mg. inclusion bodies) was collected by centrigugation. The pellet had a packed volume of one-half ml. in a 12-ml. centrifuge tube. The supernatant was treated a second time with an additional 1 ml. of lysozyme (100 mg.). The second addition resulted in the formation of an insoluble material but the second precipitate was less heavy than the first. When the second precipitate was collected, the packed volume equaled one-fourth ml. in the standard centrifuge tube. A third lysozyme addition was made to the supernatant (100 mg. lysozyme). This resulted in only a very light precipitate and on collection was less than one-tenth ml. packed volume. To produce an insecticide concentrate the precipitates are combined and suspended in cottonseed oil containing a non-ionic emulsifying agent. The product is suitable as a viral insecticide upon dilution with water immediately prior to use. The complexes resulting from the addition of lysozyme dissolved in water are much finer and somewhat easier to disperse in oil than are the complexes formed by the addition of dry crystalline lysozyme to the virus suspension.

It will be understood that the principles of this invention may be applied to the preparation, concentration and stabilization of insect polyhedrosis and granulosis viruses in many ways and that this invention is not limited to the specific examples described in the foregoing. For example, the virus particles may be liberated from the capsules or polyhedral inclusion bodies directly by alkali digestion in the presence of some or all of the insect fragments present after maceration. In such case the macerated cadavers of virus diseased insects are digested in an aqueous alkaline solution, the undissolved residue is separated by filtration or centrifugation, and the supernatant liquid or filtrate containing the virus particles and dissolved inclusion body protein is treated directly with the lysozyme in order to precipitate the virus particles. This precipitate may be suitably used as the active ingredient of a viral insecticide in accordance with this invention.

As previously suggested, the virus particles are liberated from the inclusion bodies prior to treatment with lysozyme. It is performed that this liberation be effected by digestion in an alkaline solution which preferably has a pH greater than about 8, suitably in the range of pH 8 to 10. A suitable digesting agent for this purpose is an aqueous sodium carbonate solution of a molarity of from 0.02 to 0.1M. However, it will be apparent that any protein solubilizing agent may be employed which will effectively dissolve the protein of the inclusion body but at the same time will not kill or deactivate liberated viruses. Other alkaline materials that are suitable for the purpose include sodium hydroxide, potassium carbonate, sodium phosphate, sodium borate, ammonium hydroxide, sodium barbiturate, tris (hydroxymethyl) aminomethane, and the like.

While lysozyme is preferred as a complexing agent for use in accordance with this invention, other basic proteins having an isoelectric point of above pH 8.0 may be used. For example, the protamines such as protamine sulfate and protamine nucleinate and the basic histones such as calf thymus histone all have isoelectric points greater than pH 8.0 and have been found to form protein-virus-inclusion body protein complexes. Moreover, the pH of the solution of virus particles to which the basic protein is added should be greater than 6 and preferably within the range of 8 to 10 but should not be higher than the isoelectric point of the particular protein used as the complexing agent.

In certain of the foregoing examples, the lysozyme was added to the aqueous suspension of virus particles in the form of a solid and in amounts that are in excess of that required to flocculate all of the virus particles. However, it will be apparent from Example 10 that the lysozyme may be added in solution and sometimes this may be preferred on account of ease of handling and of formation of a precipitate in the desired form. Generally an excess of lysozyme is not objectionable by for economical reasons it should not be used in amounts which are in excess of that required to flocculate all of the precipitable matter in the suspension treated. This quantity has been found to fall most often in the range between 10 and 15 milligrams of basic protein per milligram of inclusion bodies initially used in forming the alkaline solution to be treated.

The product of this invention is a composition containing the herein-described virus particles in association with the basic protein. It is believed that in the flocculation or precipitation process the basic protein forms a complex wit the virus particles and the solubilized proteins of the dissolved inclusion bodies. In any event, the basic protein serves to stabilize the virus particles against oxidation, dehydration or the effects of light. The product either in the dried or liquid form may be mixed with any appropriate carrier such as bentonite, clays, talc and the like, and may be mixed wit with sticking agents such as carboxymethyl cellulose, stick liquor, gums, acrylic resins and the like to form an insecticide or concentrate thereof. Oil has been found to be particularly useful as a carrier for this composition since the oil imparts a stability to the liberated virus particles which is desirable in connection with an insecticide having an effective commercial life. Suitable oils are the non-toxic and inert mineral oils but vegetable oils such as cottonseed oil, corn oil, peanut oil, sesame oil, safflower oil, sunflower oil, etc. are preferred.

The precipitated or complexed viruses of this invention are capable of rapidly infecting a target insect since the insect is not shielded from the virus particles by the inclusion body protein. The complexes also have value for use in biological control products when used in combination with inclusion body preparations. In these products, the more rapid infection brought about by the complexed virus complements the longer residual action (but slower initiation of disease processes) possible with inclusion body preparations of the prior art. Suitable combinations for any one target insect include the basic protein complexes of any one of the granulosis or nuclear or cytoplasmic polyhedrosis viruses in admixture wit the intact inclusion bodies of any one of these viruses.

While several particular embodiments of this invention are described in the foregoing, it will be appreciated that the invention has wide applicability in the production of insect viruses of the polyhedrosis and granulosis types and the invention encompasses all such products and processes as are set forth within the scope of the following claims.

I claim:

1. A process of preparing a stabilized viral insecticide having a high infectivity titer which comprises macerating in the presence of water bodies of an insect infected with a virus of the polyhedrosis or granulosis type to provide an aqueous suspension of virus inclusion bodies and gross insect fragments, separating said fragments from the suspension containing said inclusion bodies, contacting the resulting suspension with an alkaline reacting material for a time sufficient to liberate the virus particles from said inclusion bodies, contacting the resulting alkaline dispersion with a basic protein having an isoelectric point of at least pH 8.0 whereby to precipitate said virus particles as a complex and then dispersing the resulting complex in an insecticide carrier.

2. The process of claim 1 wherein said basic protein is lysozyme.

3. The process of claim 1 wherein said dispersion during contacting has a pH in the range of 8 to 10.

4. The process of claim 1 wherein said virus is of the nuclear polyhedrosis type.

5. The process of claim 1 in which the carrier is an oil.

6. The process of claim 5 wherein the oil is a vegetable oil.

7. The process of claim 5 wherein the oil is cottonseed oil.

* * * * *